United States Patent Office 3,594,233
Patented July 20, 1971

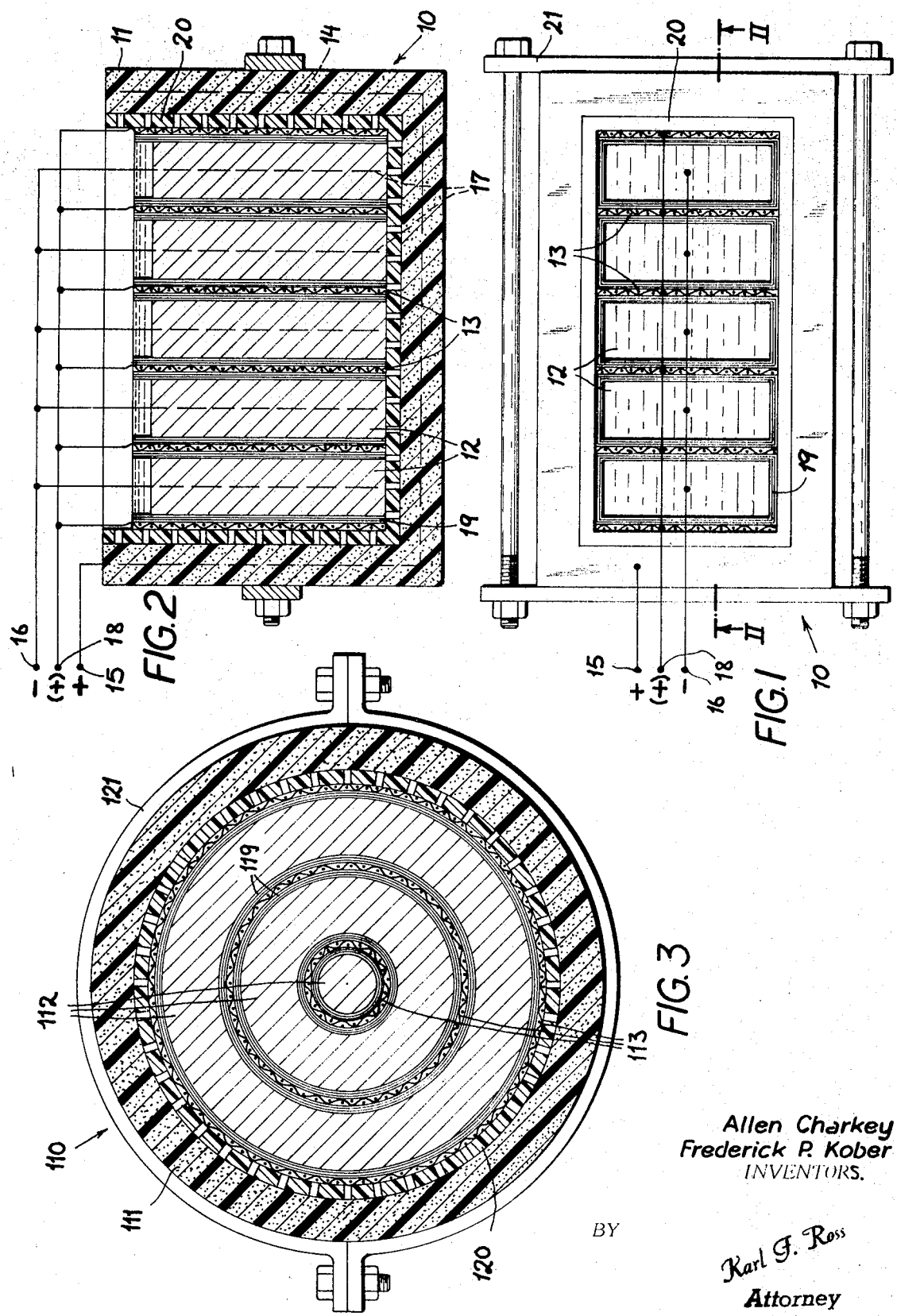

3,594,233
RECHARGEABLE GAS-POLARIZED CELL
Allen Charkey, Flushing, and Frederick P. Kober, Bayside, N.Y., assignors to Yardney International Corporation, New York, N.Y.
Filed July 19, 1968, Ser. No. 746,153
Int. Cl. H01r 29/04
U.S. Cl. 136—86                                   2 Claims

ABSTRACT OF THE DISCLOSURE

Cell with an external gas electrode enclosing a plurality of reversible metal electrodes, the latter electrodes being separated from one another and from the gas electrode by inert conductor screens serving as auxiliary recharging electrodes; the auxiliary electrode or electrodes proximal to the gas electrode may be separated therefrom by a permeable inert dielectric spacer storing a reserve quantity of liquid electrolyte.

---

Our present invention relates to a rechargeable battery cell of the type disclosed in commonly owned U.S. Pat. No. 3,219,486 issued Nov. 23, 1965 to Ricardo Salcedo Gumucio.

As disclosed in the above-identified patent, a gas-depolarizable current generator including a gas-permeable outer electrode or cathode and an oxidizable metallic inner electrode or anode may be recharged, upon more or less complete oxidation of the metallic electrode, by cathodically connecting the latter to a source of direct current together with an auxiliary electrode of inert metal (e.g. a mesh of stainless steel) serving as a charging anode. The auxiliary electrode, whose apertures enable substantially unhindered passage of liquid electrolyte therethrough, is interposed between the inner and the outer electrode in spaced relationship with both. Typical oxidizable metals to be used for the inner electrode include zinc, cadmium, tin and iron. The enveloping outer electrode may include a catalyst, such as carbon and/or silver, to promote the interaction between an alkaline electrolyte and a depolarizing gas (specifically air or oxygen). Reference in this connection may also be made to commonly assigned application Ser. No. 601,546 filed Dec. 14, 1966 by Allen Charkey and Renato Di Pasquale which teaches the manufacture of such a gas electrode from a sintered mixture of Teflon and plain or metalized (e.g. silver-coated) carbon, the proportion of carbon decreasing progressively from the inner to the outer surface of the gas electrode so as to make its inner surface relatively hydrophilic and its outer surface relatively hydrophobic.

An important object of our present invention is to provide a gas-depolarizable or fuel cell of this character which is more compact than the one disclosed in the aforementioned Salcedo patent.

Another major object of the present invention is to provide means in such fuel cell for increasing the efficiency of the recharging operation by reducing the overpotential developing at the liquid/metal interface of the oxidized inner electrode during charging.

We have found, in accordance with the present invention, that this overpotential can be appreciably lowered by dividing the oxidizable (negative) active electrode material into a plurality of spaced-apart electrode bodies so as to increase the effective surface of the mass which is to be electrolytically reduced. By thus replacing the single, centrally positioned anode plate of the Salcedo patent with a plurality of thinner, physically separated and individually accessible plates together containing the same quantity of active material, and by interposing individual auxiliary charging electrodes between the several inner electrodes so obtained (as well as between the latter electrodes and the common outer electrode), we are able to reduce the ion path and therefore increase the electric field between the source of positive potential (the charging electrodes) and virtually every point of the cathodically connected mass of active material. This results in a marked increase in the charging efficiency and in a corresponding reduction in the utilization rate of the active material involved.

In order to limit the overall size of the assembly of charging and reversible electrodes within the common gas electrode, we prefer to reduce the interelectrode spacings to a minimum by enveloping each reversible electrode in a separator of permeable or semipermeable sheet material, as is well known per se, and letting the interposed auxiliary electrodes bear directly upon the separators while also providing a suitable spacer between the gas electrode and the outermost auxiliary electrode or electrodes proximal thereto. Such a spacer, which advantageously also serves as a reservoir for additional liquid electrolyte, may consist of any porous, perforated, cellular, fibrous (woven or nonwoven) or other liquid-permeable dielectric material of inert character whose interstices preferably are substantially greater than those of the microporous gas electrode. Suitable materials not attacked by an alkaline electrolyte include nylon, Teflon, polypropylene and a variety of other synthetic resins in sheet or filamentary form. With the inner surface of the gas electrode lined with a layer of this type, the overall assembly becomes highly compact since the electrode package within the gas electrode can be placed in direct contact with this layer so as to eliminate all internal clearances.

The invention will be described in greater detail with reference to the accompanying drawing in which:

FIG. 1 is a top plan view of a cell assembly according to the invention;

FIG. 2 is a cross-sectional view taken on the line II—II of FIG. 1; and

FIG. 3 is a cross-sectional view of a modified cell assembly according to the invention.

In FIGS. 1 and 2 we have shown a battery cell 10 according to the present invention wherein a gas-permeable outer electrode 11 envelops a package including five metal electrodes 12 (e.g. of zinc) and six stainless-steel grids 13 interleaved therewith, the grids 13 constituting auxiliary electrodes for the charging of the metal electrodes 12. Gas electrode 11 may consist of sintered Teflon and carbon, e.g. with a carbon-to-Teflon ratio varying between about 1:1, by weight, at the inner surface and 1:10 at the outer surface of this electrode. Imbedded in this mixture is a metallic grid 14, e.g. of nickel, connected to a positive load terminal 15 during discharge, the associated negative load terminal 16 being connected in parallel to similar grids 17 of anodes 12. The auxiliary electrodes 13 are all connected in parallel to a charging terminal 18 which, during recharge, is connected to the positive pole of a source of direct current having its negative pole connected to terminal 16.

Each of the anodes 12 is individually wrapped in one or more layers of separator material 19, e.g. cellophane; rising above the tops of the anodes to the same height with grid electrodes 13; in FIG. 2 this height coincides with the level of the electrolyte in which the electrodes 12 and their wrappings 19 are immersed within the container-shaped envelope electrode 11. The separators 19 may also include one or more layers of nylon mesh, paper or other porous sheet material.

Another microporous layer 20, e.g. a perforated Teflon sheet, lines the inner surface or gas electrode 11 and separates it from the nearest auxiliary electrodes 13. The entire assembly may be tightly clamped in a surrounding frame 21 or some other structure leaving the outer surface of envelope electrode 11 accessible to ambient air or to a stream of oxygen supplied thereto; this clamping structure also serves to brace the outer electrode 11 against internal pressures exerted by the swelling separators 19.

Naturally, any number of cells 10 may be juxtaposed in such a frame or similar structure and may be interconnected in series or in aprallel to form a battery.

In FIG. 3 we have shown a modified cell 110 whose outer electrode or cathode 111, inner electrodes or anodes 112 and interposed auxiliary electrodes 113 are in the form of coaxial cylinders, as are the interelectrode separators 119 and the perforated cathode layer 120. The entire assembly may again be inserted in a bracing structure 121.

By thus subdividing the oxidizable mass into a plurality of spaced-apart anodes, we have been able to improve the charging rate and to reduce the utilization of active anode material to almost its theoretical value. With zinc anodes, for example, the cell could be recharged several times in five hours or less, with a zinc utilization on the order of 1.30 to 1.35 g./ah. as compared with a utilization of 2.0 to 2.5 g./ah. for a single-anode construction. The theoretical utilization rate of zinc is 1.23 g./ah.

It is possible, during recharging, to connect the terminals 15 and 18 in parallel so that the gas electrode 20 (or 120) contributes to the reduction of the inner electrode structure, particularly the anode or anodes 12 (or 112) nearest to this gas electrode. In this case it is possible to omit the outermost auxiliary electrode or electrodes interposed between the gas electrode and the nearest anode or anodes. Care must be taken, however, to select for the auxiliary electrode or electrodes a material (e.g. nickel, silver, stainless steel) whose oxygen overvoltage is less than that developed at the gas electrode during recharging.

We claim:

1. A rechargeable battery cell comprising an outer electrode permeable to a depolarizing gas, said electrode being connected to a first terminal and having the shape of a container closed at its bottom and sides; a perforated layer of inert electrolyte-permeable dielectric material lining the inner wall surface of said electrode along said bottom and sides; a purality of oxidizable inner electrodes spacedly disposed in said outer electrode and resting on the bottom thereof, said inner electrodes being connected in parallel to a common second terminal for delivery of electric energy to a load connected across said first and second terminals; a wrapping of electrolyte-permeable separator material enveloping each of said inner electrodes and projecting thereabove within said outer electrode; a plurality of grids of inert conductive material disposed in said outer envelope in interleaved relationship with said inner electrodes and separated therefrom by said wrappings, said grids being connected in parallel to a common third terminal for recharging said inner electrodes upon connection of said second and third terminals across a source of charging voltage; and a liquid electrolyte in said outer electrode permeating said wrappings and rising to a level above the tops of said inner electrodes.

2. A battery cell as defined in claim 1 wherein said grids extend above said inner electrodes to substantially the upper edges of said wrappings.

References Cited

UNITED STATES PATENTS

| | | | |
|---|---|---|---|
| 2,727,083 | 12/1955 | Hollman et al. | 136—30 |
| 3,132,053 | 5/1964 | Krebs | 136—3 |
| 3,219,486 | 11/1965 | Gumacio | 136—86 |
| 3,300,345 | 1/1967 | Lyons | 136—86 |
| 3,446,675 | 5/1969 | Jost | 136—86 |

ALLEN B. CURTIS, Primary Examiner

U.S. Cl. X.R.

136—164